United States Patent
Nam et al.

(10) Patent No.: US 9,624,410 B2
(45) Date of Patent: Apr. 18, 2017

(54) ADHESIVE COMPOSITION FOR POLARIZING PLATE, POLARIZING PLATE INCLUDING THE SAME AND OPTICAL DISPLAY INCLUDING THE SAME

(71) Applicant: SAMSUNG SDI CO., LTD., Yongin-si, Gyeonggi-do (KR)

(72) Inventors: Irina Nam, Uiwang-si (KR); Young Jong Kim, Uiwang-si (KR); Il Jin Kim, Uiwang-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/971,441

(22) Filed: Dec. 16, 2015

(65) Prior Publication Data
US 2016/0177145 A1   Jun. 23, 2016

(30) Foreign Application Priority Data

Dec. 19, 2014 (KR) .................. 10-2014-0185002

(51) Int. Cl.
| | | |
|---|---|---|
| *G02B 5/30* | (2006.01) | |
| *C09J 133/08* | (2006.01) | |
| *C09J 7/02* | (2006.01) | |
| *C09J 133/14* | (2006.01) | |

(52) U.S. Cl.
CPC ........... *C09J 133/08* (2013.01); *C09J 7/0246* (2013.01); *C09J 133/14* (2013.01); *G02B 5/305* (2013.01); *C09J 2205/102* (2013.01); *C09J 2401/00* (2013.01); *C09J 2433/00* (2013.01)

(58) Field of Classification Search
CPC ...................................... G02B 5/305
See application file for complete search history.

(56) References Cited

U.S. PATENT DOCUMENTS

2009/0233093 A1*  9/2009  Toyama ................ C09J 7/0217
                                                              428/354

FOREIGN PATENT DOCUMENTS

JP            5379410           12/2013

\* cited by examiner

*Primary Examiner* — Wenwen Cai
(74) *Attorney, Agent, or Firm* — Lee & Morse, P.C.

(57) ABSTRACT

A polarizing plate including an adhesive film for polarizing plates and an optical display including the polarizing plate, the adhesive film being formed from an adhesive composition for polarizing plates, the adhesive composition including a tertiary amine group-containing (meth)acrylic copolymer; a cellulose resin; an isocyanate compound; and a metal chelate compound.

18 Claims, 3 Drawing Sheets

ADHESIVE COMPOSITION FOR POLARIZING PLATE, POLARIZING PLATE INCLUDING THE SAME AND OPTICAL DISPLAY INCLUDING THE SAME

CROSS-REFERENCE TO RELATED APPLICATION

Korean Patent Application No. 10-2014-00185002, filed on Dec. 19, 2014, in the Korean Intellectual Property Office, and entitled: "Adhesive Composition for Polarizing Plate, Polarizing Plate Comprising the Same and Optical Display Comprising the Same," is incorporated by reference herein in its entirety.

1. Field

Embodiments relate to an adhesive composition for polarizing plates, a polarizing plate including the same, and an optical display including the same.

2. Description of the Related Art

A liquid crystal display (LCD) may include an LCD panel and polarizing plates on both surfaces of the LCD panel. The polarizing plates may be stacked on the LCD panel via adhesive films for polarizing plates. An adhesive composition for polarizing plates may be coated onto one surface of a polarizing plate or a release film, followed by aging for a predetermined period of time before use.

SUMMARY

Embodiments are directed to an adhesive composition for polarizing plates, a polarizing plate including the same, and an optical display including the same.

The embodiments may be realized by providing an adhesive composition for polarizing plates, the composition including a tertiary amine group-containing (meth)acrylic copolymer; a cellulose resin; an isocyanate compound; and a metal chelate compound.

The adhesive composition may have a gel fraction of about 50% or more after 12-hour aging, as calculated according to the following equation:

Gel fraction=$(WC-WA)/(WB-WA)\times 100$, wherein WA is a weight of a wire mesh; WB is a total weight of the wire mesh and a specimen of an adhesive film for polarizing plates, which is obtained by depositing 1.0 g of an adhesive composition for polarizing plates to a thickness of 20 μm on a release film, followed by aging the adhesive composition for polarizing plates on the release film at 23° C. and 55% RH for 12 hours, and then is placed on the wire mesh; and WC is a total weight of the wire mesh and the adhesive film, which are placed in a sample bottle, left for 1 day after adding 50 cc of ethyl acetate to the sample bottle, and then dried at 90° C. for 24 hours.

The adhesive composition may have an absolute value of a difference between a gel fraction after 12-hour aging and a gel fraction after 48-hour aging of about 5% or less.

The composition may include 100 parts by weight of the tertiary amine group-containing (meth)acrylic copolymer; about 3 parts by weight to about 10 parts by weight of the cellulose resin; about 0.05 parts by weight to about 5 parts by weight of the isocyanate compound; and about 0.01 parts by weight to about 10 parts by weight of the metal chelate compound.

The tertiary amine group-containing (meth)acrylic copolymer may include about 0.01 wt % to about 5 wt % of (meth)acrylic repeat units having a tertiary amine group, based on a total weight of repeat units in the copolymer.

The tertiary amine group-containing (meth)acrylic copolymer may be prepared by copolymerization of a monomer mixture, the monomer mixture including a hydroxyl group-containing (meth)acrylic monomer, a tertiary amine group-containing (meth)acrylic monomer, and a monomer having a glass transition temperature Tg of about 100° C. or higher.

The monomer mixture may further include an alkyl group-containing (meth)acrylic monomer.

The tertiary amine group-containing (meth)acrylic monomer may include N,N-(dimethylamino)ethyl (meth)acrylate or N,N-(diethylamino)ethyl (meth)acrylate.

The monomer having a glass transition temperature Tg of about 100° C. or more may include (meth)acryloyl morpholine, N-vinylpyrrolidone, or isobornyl (meth)acrylate.

The monomer mixture may include about 0.1 wt % to about 20 wt % of the hydroxyl group-containing (meth)acrylic monomer, about 0.01 wt % to about 5 wt % of the tertiary amine group-containing (meth)acrylic monomer, about 1 wt % to about 30 wt % of the monomer having a glass transition temperature Tg of about 100° C. or more, and about 60 wt % to about 95 wt % of the alkyl group-containing (meth)acrylic monomer.

The tertiary amine group-containing (meth)acrylic copolymer may have a glass transition temperature of about −45° C. to about −30° C.

The cellulose resin may be cellulose acetate butyrate.

The cellulose resin may include about 1 wt % to about 10 wt % of a hydroxyl group, based on a total weight of the cellulose resin.

The metal chelate compound may be a tin-based chelate compound or an aluminum-based chelate compound.

A weight ratio of the isocyanate compound to the metal chelate compound may be 1:0.05 to 1:5.

The adhesive composition for polarizing plates may further include a silane coupling agent or a reworking agent.

The composition may include the silane coupling agent, and the silane coupling agent may include an acetoacetyl group-containing silane coupling agent.

The embodiments may be realized by providing a polarizing plate including an adhesive film for polarizing plates, the adhesive film being formed of the adhesive composition for polarizing plates according to an embodiment.

The embodiments may be realized by providing an optical display including the polarizing plate according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. In addition, it will also be understood that when a layer is referred to as being "between" two layers, it can be the only layer between the two layers, or one or more intervening layers may also be present. Like reference numerals refer to like elements throughout.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

As used herein, the term, e.g., "(meth)acryl" refers to acryl and/or methacryl.

As used herein, "gel fraction" is defined according to the following Equation 1.

$$\text{Gel fraction (\%)} = (WC - WA)/(WB - WA) \times 100 \quad (1),$$

In Equation 1, WA is a weight of a wire mesh; WB is a total weight of the wire mesh and a specimen of an adhesive film for polarizing plates, which is obtained by depositing 1.0 g of an adhesive composition for polarizing plates to a thickness of 20 μm on a release film, followed by aging the adhesive composition on the release film at 23° C. and 55% RH (relative humidity) for a predetermined period of time (e.g., aging time of 12 hours, 48 hours, etc.), and then is placed on the wire mesh; and WC is a total weight of the wire mesh and the adhesive film, which are placed in a sample bottle, left for 1 day after adding 50 cc of ethyl acetate to the sample bottle, and then dried at 90° C. for 24 hours.

As used herein, the term "aging time" means an initial period of time for which the adhesive composition for polarizing plates has a gel fraction of about 50% or more as calculated according to Equation 1.

According to an embodiment, an adhesive composition for polarizing plates may include, e.g., a tertiary amine group-containing (meth)acrylic copolymer (A); a cellulose resin (B); and a curing agent (C).

Next, each of the components of the adhesive composition for polarizing plates will be described in detail.

(A) Tertiary Amine Group-Containing (Meth)Acrylic Copolymer

The tertiary amine group-containing (meth)acrylic copolymer may be prepared by copolymerization of a monomer mixture including a hydroxyl group-containing (meth) acrylic monomer, a tertiary amine group-containing (meth) acrylic monomer, and a monomer having a glass transition temperature Tg of about 100° C. or more.

To the backbone of the tertiary amine group-containing (meth)acrylic copolymer, a hydroxyl group, a tertiary amine group and moieties derived from the monomer having a glass transition temperature Tg of about 100° C. or more may be bonded to reduce aging time of the adhesive composition for polarizing plates while improving gel fraction even when the composition is aged for only 12 hours, without causing variation in gel fraction even when aged an additional, e.g., 12 hours, thereby improving reliability.

As used herein, the term "glass transition temperature" in the expression "monomer having a glass transition temperature Tg of about 100° C. or more" means a glass transition temperature measured on a homopolymer having the corresponding monomer as a repeat unit.

The hydroxyl group-containing (meth)acrylic monomer provides a hydroxyl group to the (meth)acrylic copolymer to facilitate a reaction of the (meth)acrylic copolymer with the curing agent. During aging of the adhesive composition for polarizing plates, the reaction between the hydroxyl group of the (meth)acrylic copolymer with the curing agent may occur. According to an embodiment, aging may be carried out for a reduced period of time, and the reaction rate between the hydroxyl group and the curing agent may be increased.

The hydroxyl group-containing (meth)acrylic monomer may include a (meth)acrylic acid ester containing a $C_1$ to $C_{20}$ alkyl group having at least one hydroxyl group. For example, the hydroxyl group-containing (meth)acrylic monomer may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth) acrylate, or a combination thereof. In an implementation, the hydroxyl group-containing (meth)acrylic monomer may include, e.g., 2-hydroxyethyl (meth)acrylate, 2-hydroxypropyl (meth)acrylate, 2-hydroxybutyl (meth)acrylate, and/or 4-hydroxybutyl (meth)acrylate.

In an implementation, the hydroxyl group-containing (meth)acrylic monomer may be present in an amount of about 0.1% by weight (wt %) to about 20 wt %, e.g., about 1 wt % to about 10 wt %, about 1 wt % to about 6 wt %, or about 5 wt % to about 10 wt %, in the monomer mixture (e.g., based on a total weight of the monomer mixture). Within this range, the hydroxyl group-containing (meth) acrylic monomer allows the tertiary amine group-containing (meth)acrylic copolymer and the curing agent to be sufficiently cured to reduce aging time of the adhesive composition while further improving reliability.

The tertiary amine group-containing (meth)acrylic monomer may provide a tertiary amine group to the backbone of the (meth)acrylic copolymer, thereby reducing aging time of the adhesive composition. Although the tertiary amine group of the (meth)acrylic monomer may not directly react with the curing agent, the tertiary amine group of the (meth) acrylic monomer may have an unshared electron pair and thus may promote a reaction between the hydroxyl group of the (meth)acrylic copolymer and an isocyanate curing agent to reduce aging time of the adhesive composition, while evenly increasing the crosslinking density of the adhesive film after aging. Furthermore, the tertiary amine group of the (meth)acrylic monomer may facilitate smooth mixing of the adhesive composition without gelation or formation of non-soluble precipitates.

If an adhesive composition were to include a compound having a tertiary amine group such as N,N-dimethylethanolamine (instead of the tertiary amine group-containing (meth)acrylic monomer), a compound having a tertiary amine group can be unevenly moved and distributed within the adhesive composition, thereby providing uneven crosslinking density of the adhesive film while deteriorating transparency of the adhesive film. In addition, a (meth)

acrylic copolymer prepared by copolymerization of a (meth) acrylic monomer having a primary amine group or a secondary amine group may not permit smooth mixing of the adhesive composition due to much higher reactivity of the primary amine group and the secondary amine group than the tertiary amine group, and may cause gelation or formation of highly dense non-soluble precipitates of the adhesive composition during mixing.

In an implementation, the tertiary amine group-containing (meth)acrylic monomer may include, e.g., N,N-(dimethylamino)ethyl (meth)acrylate, N,N-(diethylamino)ethyl (meth)acrylate, or a combination thereof In an implementation, the tertiary amine group-containing (meth)acrylic monomer may be present in an amount of about 0.01 wt % to about 5 wt %, e.g., about 0.012 wt % to about 1 wt % or about 0.05 wt % to about 1 wt % in the monomer mixture. Within this range, the tertiary amine group-containing (meth)acrylic monomer may promote the reaction between the (meth)acrylic copolymer and the curing agent to reduce aging time of the adhesive composition while providing good pot-life, thereby improving coatability of the adhesive composition.

In an implementation, the tertiary amine group-containing (meth)acrylic copolymer may include about 0.01 wt % to about 5 wt % of (meth)acrylic repeat units having a tertiary amine group, based on a total weight of the repeat units (e.g., based on a total weight of the copolymer). Within this range, the tertiary amine group-containing (meth)acrylic monomer may further promote reaction between the (meth)acrylic copolymer and the curing agent to further reduce aging time of the adhesive composition while further improving pot-life, thereby improving coatability of the adhesive composition.

The monomer having a glass transition temperature of about 100° C. or more may increase the glass transition temperature of the (meth)acrylic copolymer to reduce aging time of the adhesive composition. In an implementation, the monomer having a glass transition temperature of about 100° C. or more may include a monomer having a glass transition temperature of about 100° C. to about 200° C. In an implementation, the monomer having a glass transition temperature of about 100° C. or more may include, e.g., (meth)acryloyl morpholine, N-vinylpyrrolidone, isobornyl (meth)acrylate, or a combination thereof. For example, (meth)acryloyl morpholine may form a hydrogen bond with the hydroxyl group of the (meth)acrylic copolymer, thereby further reducing aging time of the adhesive composition.

In an implementation, the monomer having a glass transition temperature of about 100° C. or more may be present in an amount of about 1 wt % to about 30 wt %, e.g., about 5 wt % to about 20 wt %, about 5 wt % to about 15 wt %, about 5 wt % to about 12 wt %, or about 5 wt % to about 10 wt %, in the monomer mixture. Within this range, the monomer having a glass transition temperature of about 100° C. or more may further reduce aging time of the adhesive composition while further improving reliability thereof.

The tertiary amine group-containing (meth)acrylic monomer and the monomer having a glass transition temperature of about 100° C. or more may help reduce aging time of the adhesive composition, and a weight ratio of these monomers in the monomer mixture may be adjusted to further reduce aging time. In an implementation, in the monomer mixture, the weight ratio of the monomer having a glass transition temperature of about 100° C. or more to the tertiary amine group-containing (meth)acrylic monomer may be about 1:1 to about 1,000:1, e.g., about 10:1 to about 500:1, or about 10:1 to about 200:1. Within this range, the adhesive composition may further reduce aging time. In an implementation, the tertiary amine group-containing (meth)acrylic monomer and the monomer having a glass transition temperature of about 100° C. or more may be present in the monomer mixture in a total amount of about 5 wt % to about 30 wt %, e.g., about 5 wt % to about 25 wt % or about 5 wt % to about 15 wt %. Within this range, the adhesive composition may help further reduce aging time.

The monomer mixture for the tertiary amine group-containing (meth)acrylic copolymer may not include a monomer having a carboxylic acid group (—COOH group), e.g., the tertiary amine group-containing (meth)acrylic copolymer may not include a carboxylic acid group. In an implementation, the tertiary amine group-containing (meth) acrylic copolymer may have an acid value of about 0.3 mgKOH/g or less, e.g., about 0 mgKOH/g to about 0.3 mgKOH/g, and may help prevent an electrode film such as an indium tin oxide (ITO) film from being damaged by the carboxylic acid group upon use of an adhesive film in a touchscreen or an LCD panel.

The monomer mixture for the tertiary amine group-containing (meth)acrylic copolymer may further include an alkyl-group containing (meth)acrylic monomer. The alkyl-group containing (meth)acrylic monomer may help increase mechanical strength of an adhesive film formed of the adhesive composition.

The alkyl group-containing (meth)acrylic monomer may include an unsubstituted $C_1$ to $C_{20}$, e.g., $C_4$ to $C_{12}$ alkyl group-containing (meth)acrylic acid ester. In an implementation, the alkyl group-containing (meth)acrylic monomer may include, e.g., methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth) acrylate, nonyl (meth)acrylate, decyl (meth)acrylate and dodecyl (meth)acrylate, or a combination thereof.

In an implementation, the alkyl group-containing (meth) acrylic monomer may be present in an amount of about 60 wt % to about 95 wt %, e.g., about 75 wt % to about 90 wt % or about 80 wt % to about 85 wt % in the monomer mixture. Within this range, the alkyl group-containing (meth)acrylic monomer may help improve tack (e.g., tackiness) of the adhesive composition.

In an implementation, the monomer mixture for the tertiary amine group-containing (meth)acrylic copolymer may include, e.g., about 0.1 wt % to about 20 wt % of the hydroxyl group-containing (meth)acrylic monomer, about 0.01 wt % to about 5 wt % of the tertiary amine group-containing (meth)acrylic monomer, about 1 wt % to about 30 wt % of the monomer having a glass transition temperature of about 100° C. or more, and about 60 wt % to about 95 wt % of the alkyl group-containing (meth)acrylic monomer. Within this range of the monomers, the adhesive composition may help further reduce aging time.

In an implementation, the tertiary amine group-containing (meth)acrylic copolymer may have a glass transition temperature of about −45° C. to about −30° C., e.g., about −40° C. to about −30° C. Within this range, the adhesive composition may help further reduce aging time and may have improved durability.

In an implementation, the tertiary amine group-containing (meth)acrylic copolymer may have a weight average molecular weight (Mw) of about 200,000 g/mol to about 2,000,000 g/mol, e.g., about 600,000 g/mol to about 1,300, 000 g/mol. Within this range, the adhesive composition may exhibit good adhesive strength, suppress light leakage, and have good durability. The weight average molecular weight may be measured using gel permeation chromatography with a polystyrene standard.

In an implementation, the tertiary amine group-containing (meth)acrylic copolymer may have a polydispersity index of, e.g., about 2.5 to about 15.0. Within this range, the adhesive composition including the (meth)acrylic copolymer may help secure desired durability.

In an implementation, the tertiary amine group-containing (meth)acrylic copolymer may have a viscosity at 25° C. of about 2,000 cPs to about 20,000 cPs, e.g., about 3,500 cPs to about 15,000 cPs. Within this range, the adhesive composition including the (meth)acrylic copolymer may help secure good coatability.

The tertiary amine group-containing (meth)acrylic copolymer may be prepared by adding an initiator to the monomer mixture, followed by a suitable polymerization of the copolymer, e.g., suspension polymerization, emulsion polymerization, solution polymerization, or the like. For example, the polymerization may be performed at about 65° C. to about 80° C. for about 6 hours to about 10 hours. In an implementation, the initiator may include, e.g., azo-based polymerization initiators such as azobisisobutyronitrile, azobiscyclohexanecarbonitrile, azobisdimethylvaleronitrile, and dimethyl 2,2'-azobis(2-methylpropionate); mercapto compounds including 2-mercaptoethanol; and/or peroxide polymerization initiators such as benzoyl peroxide or acetyl peroxide. In an implementation, the initiator may be present in an amount of about 0.01 parts by weight to about 5 parts by weight, based on 100 parts by weight of the monomer mixture for the (meth)acrylic copolymer. Within this range, the initiator can provide suitable storage modulus to the adhesive composition applicable to products.

(B) Cellulose Resin

The cellulose resin (B) may be introduced to impart high storage modulus to the adhesive composition through uniform dispersion and mixing with the tertiary amine group-containing (meth)acrylic copolymer (A) and the curing agent (C).

In an implementation, the cellulose resin may contain about 1 wt % or more of a hydroxyl group (—OH) (based on a total weight of the cellulose resin) in order to help secure sufficient compatibility and solubility with the tertiary amine group-containing (meth)acrylic copolymer or a solvent for diluting the adhesive composition. When the cellulose resin is used, the hydroxyl group of the cellulose resin could react with an isocyanate group of the crosslinking agent to accelerate crosslinking reaction, thereby causing deterioration in adhesive strength and delamination of the polarizing plate. Thus, by taking into account compatibility with other components of the adhesive composition and delamination of the polarizing plate resulting from deterioration in adhesive strength, the cellulose resin may contain, e.g., about 1 wt % to about 10 wt % of the hydroxyl group.

In an implementation, the cellulose resin may have a weight average molecular weight (Mw) of about 10,000 g/mol to about 100,000 g/mol. Within this range, the cellulose resin can exhibit further improved compatibility and adhesive strength.

Examples of the cellulose resin may include cellulose acetate (CA), cellulose acetate butyrate (CAB), cellulose acetate propionate (CAP), carboxymethylcellulose (CMC), cellulose nitrate (CN), cellulose propionate (CP), ethylcellulose (EC), carboxymethyl cellulose acetate butyrate (CM-CAB), and the like. These may be used alone or in combination thereof.

The cellulose resin may be present in an amount of about 3 parts by weight to about 10 parts by weight, based on 100 parts by weight of the tertiary amine group-containing (meth)acrylic copolymer (dry weight). Maintaining the content of the cellulose resin at about 3 parts by weight or greater may help ensure that the adhesive composition has sufficient storage modulus to provide sufficient suppression of light leakage. Maintaining the content of the cellulose resin at about 10 parts by weight or less may help ensure that the adhesive composition does not suffer from deterioration in adhesion.

Such a cellulose resin may be used in powder form, and a long time may be required for the cellulose resin to dissolve and be uniformly dispersed when the cellulose resin is directly added to the (meth)acrylic copolymer having high viscosity. Accordingly, the cellulose resin may be added to the adhesive composition after being completely dissolved in a solvent. A suitable solvent may be used to dissolve the cellulose resin. For example, the same kind of solvent as the solvent used in preparation of an acrylic copolymer may be used and ethyl acetate, toluene, xylene or methylethylketone may be used as an acetate, benzene or ketene-based solvent.

(C) Curing Agent

The curing agent may react with the tertiary amine group-containing (meth)acrylic copolymer to form an adhesive film. In an implementation, the curing agent may include an isocyanate curing agent, e.g., an isocyanate compound (c1) as a first curing agent and a metal chelate compound (c2) as a second curing agent.

Examples of the isocyanate compound (c1) may include an aromatic isocyanate such as tolylene diisocyanate and xylene diisocyanate; an alicyclic isocyanate such as isophorone diisocyanate; and an aliphatic isocyanate such as hexamethylene diisocyanate. For example, an isocyanate compound selected from among these compounds or an epoxy compound may help provide suitable cohesion to the adhesive composition. These isocyanate compounds may be used alone or in combination thereof.

Examples of the isocyanate compound (c1) may include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenyl-methane diisocyanate, xylylene diisocyanate; and isocyanate adducts such as trimethylolpropane/tolylene diisocyanate, trimethylolpropane/tolylene diisocyanate trimer adduct, trimethylolpropane/hexamethylene diisocyanate, trimethylolpropane/hexamethylene diisocyanate trimer adduct, and isocyanurates of hexamethylene diisocyanate.

Other examples of the isocyanate compound (c1) may include aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethyl xylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TMHDI), lysine diisocyanate, and norbornane diisocyanate methyl (NBDI); alicyclic isocyanates, such as trans-cyclohexane-1,4-diisocyanate, isophorone diisocyanate (IPDI), H6-XDI (hydrogenated XDI), and H12-

MDI (hydrogenated MDI); carbodiimide-modified diisocyanates of the foregoing diisocyanates; and isocyanurate-modified diisocyanates thereof. In an implementation, adducts of these isocyanate compounds and polyol compounds, or biurets or isocyanurates of these isocyanate compounds may be used.

The isocyanate compound may be obtained by synthesis or from commercially available products. Commercially available products of the isocyanate-based curing agent may include, e.g., Coronate® L (trimethylolpropane/tolylene diisocyanate trimer adduct), Coronate® HL (trimethylolpropane/hexamethylene diisocyanate trimer adduct), Coronate® HX (isocyanurates of hexamethylene diisocyanate), Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate® 24A-100, Duranate® TPA-100, Duranate® TKA-100, Duranate® P301-75E, Duranate® E402-90T, Duranate® E405-80T, Duranate® TSE-100, Duranate® D-101, and Duranate® D-201 (all available from Asahi Kasei Corporation), and the like. These may be used alone or in combination thereof.

In an implementation, Coronate® L, Coronate® HL, Takenate® D-110N, and Duranated™ 24A-100, more specifically Coronate® L and Takenate® D-110N, still more specifically Coronate® L may be used to further improve curing properties.

In an implementation, the isocyanate compound (c1) may be present in an amount of about 0.05 parts by weight to about 5 parts by weight, e.g., about 0.05 parts by weight to about 1 parts by weight, based on 100 parts by weight of the tertiary amine group-containing (meth)acrylic copolymer (dry weight). Within this range, the adhesive composition can exhibit excellent adhesion and light leakage suppression.

The metal chelate compound (c2) may have high reactivity with the tertiary amine group-containing (meth)acrylic copolymer (A) to help reduce aging time, and may help prevent deformation of a polarizing plate attached to an adhesive layer at high temperature while further improving warpage characteristics of an adhesive film when used together with the isocyanate compound (c1).

Examples of the metal chelate compound may include acetyl acetone of polyhydric metals, such as tin, aluminum, iron, copper, zinc, titanium, nickel, antimony, magnesium, vanadium, chrome, and zirconium; and acetoacetic acid ester coordination compounds.

In an implementation, the metal chelate compound may include a tin-based chelate compound, e.g., tin oxalate, dibutyltin dilaurate, dibutyltin diacetate, and/or tributyltin laurate.

In an implementation, the metal chelate compound may include an aluminum-based chelate compound, e.g., aluminum tris(acetylacetonate), aluminum tris(ethylacetoacetate), aluminum monoacetylacetonate bis(ethyl acetoacetate), aluminum monoacetylacetonate bis(oleyl acetoacetate), ethylacetoacetate aluminum diisopropylate, and/or alkylacetoacetate aluminum diisopropylate.

In an implementation, the metal chelate compound (c2) may be present in an amount of about 0.01 parts by weight to about 10 parts by weight, e.g., about 0.01 parts by weight to about 5 parts by weight, about 0.01 parts by weight to about 1 parts by weight, about 0.05 parts by weight to about 1 parts by weight, or about 0.1 parts by weight to about 1 parts by weight, based on 100 parts by weight of the tertiary amine group-containing (meth)acrylic copolymer (dry weight). Within this range, the metal chelate can prevent deformation of the polarizing plate at high temperature while securing good coatability.

In an implementation, a weight ratio of the isocyanate compound (c1) to the metal chelate compound (c2) in the curing agent may be 1:0.05 to 1:5, e.g., 1:0.05 to 1:2. Within this range, the curing agent may provide suitable effects.

The adhesive composition for polarizing plates may further include at least one of a silane coupling agent and/or a reworking agent.

The silane coupling agent may help enhance adhesion of a polarizing plate with respect to a liquid crystal display panel and a suitable silane coupling agent may be used. In an implementation, the silane coupling agent may include, e.g., epoxy group-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; acetoacetyl group-containing silicon compounds such as acetoacetate propyltrimethoxysilane; and/or mercapto group-containing silicon compounds such as 3-mercaptopropylmethyldimethoxysilane and 3-mercaptopropyltrimethoxysilane. For example, an acetoacetyl group-containing silicon compound may be used as the silane coupling agent to improve moisture resistance.

In an implementation, the silane coupling agent may be present in an amount of about 0.001 parts by weight to about 5 parts by weight, e.g., about 0.01 parts by weight to about 1 part by weight, based on 100 parts by weight of the tertiary amine group-containing (meth)acrylic copolymer. Within this range of the silane coupling agent, the adhesive composition may help improve moisture resistance.

The reworking agent may help enhance reworkability of the adhesive film and may include, e.g., a polysiloxane oligomer. In an implementation, the reworking agent may be present in an amount of about 0.001 parts by weight to about 5 parts by weight, e.g., about 0.01 parts by weight to about 1 part by weight, based on 100 parts by weight of tertiary amine group-containing (meth)acrylic copolymer. Within this range, the reworking agent may provide reworking effects.

The adhesive composition for polarizing plates may further include an additive. The additive may include, e.g., tackifiers, antioxidants, antistatic agents, corrosion inhibitors, leveling agents, surface lubricants, dyes, pigments, anti-foaming agents, fillers, light stabilizers, or the like. The additive may be present in an amount of about 0.001 parts by weight to about 5 parts by weight, based on 100 parts by weight of the tertiary amine group-containing (meth)acrylic copolymer.

The adhesive composition for polarizing plates according to an embodiment may have a short aging time (e.g., may be suitable for forming an adhesive film for polarizing plate or may exhibit desirable properties even if aged for only a short time) and thus may not require use of an aging chamber, thereby providing good processability. In an implementation, the adhesive composition for polarizing plates may have an aging time of about 12 hours or less, e.g. about 5 hours to about 12 hours (e.g., the composition may be suitable for use even if aged for only about 5 hours to about 12 hours). Within this range of the aging time, the adhesive composition may exhibit good processability.

The adhesive composition for polarizing plates according to an embodiment may have a high gel fraction after only 12-hour aging, and the adhesive composition may sufficiently attach, e.g., a polarizing plate to a liquid crystal display panel or an organic light emitting device even if aged for only 12 hours. In an implementation, the adhesive composition for polarizing plates may have a gel fraction G12 after 12-hour aging of about 50% or more, e.g. about 59% to about 90% or about 59% to about 70%. Within this range of the gel fraction after 12-hour aging, the adhesive composition may be used in or to form an adhesive film for polarizing plates and may not require an aging chamber in manufacture of the adhesive film, thereby providing good processability.

In an implementation, the adhesive composition for polarizing plates may have an absolute value of a difference between a gel fraction G12 after 12-hour aging and a gel fraction G48 after 48-hour aging (|G48−G12|) of about 5% or less, e.g., about 0.1% to about 5. Within this range, an adhesive film formed of or from the adhesive composition may be stabilized to provide good reliability.

According to an embodiment, a polarizing plate may include an adhesive film for polarizing plates formed of the adhesive composition for polarizing plates according to the embodiments.

Next, a polarizing plate according to one embodiment will be described with reference to FIG. 1.

Figure 1:
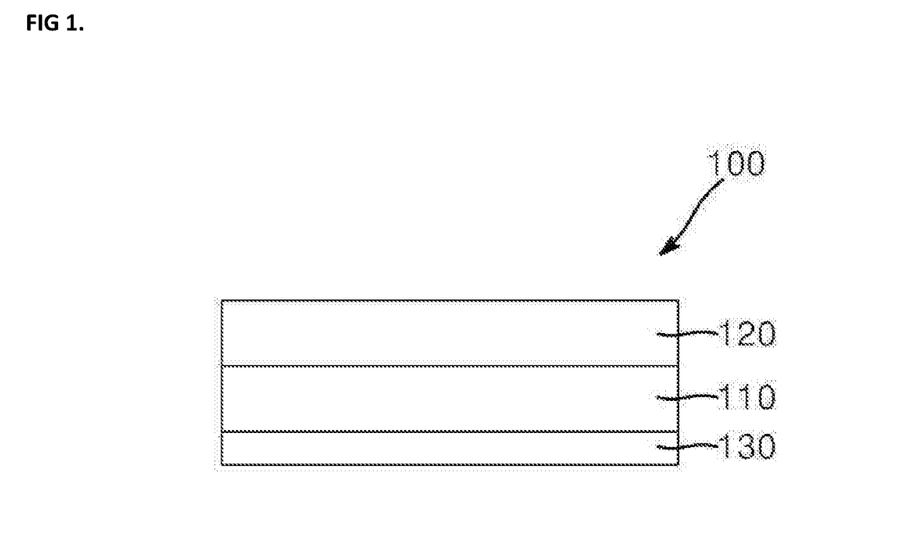
FIG. 1 illustrates a sectional view of a polarizing plate according to one embodiment.

Referring to FIG. 1, a polarizing plate 100 according to one embodiment may include a polarizer 110, a first optical film 120 formed on an upper surface of the polarizer 110, and an adhesive film 130 formed on a lower surface of the polarizer 110, wherein the adhesive film 130 may be formed of the adhesive composition for polarizing plates according to the embodiment. As a result, the polarizing plate may not suffer from failure such as falling out, detachment, and bubbling of the adhesive film, and may exhibit good peel strength and durability while preventing light leakage.

The polarizer 110 may have molecular alignment in a specific direction to allow transmission of light in the specific direction when mounted on a liquid crystal display, and may be fabricated by dyeing a polyvinyl alcohol film with iodine or dichroic dyes, followed by stretching the film in a predetermined direction.

The polarizer 110 may have a thickness of about 3 μm to about 100 μm, e.g., about 10 μm to about 25 μm. Within this range, the polarizer may be used in a polarizing plate for optical displays.

The first optical film 120 may protect the polarizer 110 and may be an optically transparent film. For example, the first optical film may be formed of at least one resin of cellulose resins including triacetylcellulose, polyester resins including polyethylene terephthalate, polybutylene terephthalate, polyethylene naphthalate, and polybutylene naphthalate, cyclic polyolefin resins, polycarbonate resins, polyether sulfone resins, polysulfone resins, polyamide resins, polyimide resins, polyolefin resins, polyacrylate resins, polyvinyl alcohol resins, polyvinyl chloride resins, polyvinylidene chloride resins, or a combination thereof.

The first optical film 120 may have a thickness of about 10 μm to about 200 μm. Within this range, the first optical film may be applied to an optical display.

The adhesive film 130 may be fabricated by aging the adhesive composition for polarizing plates according to the embodiment. For example, the adhesive film may be fabricated by aging the adhesive composition at about 23° C. and about 55% RH for about 12 hours. The adhesive film 130 may have a thickness of about 1 μm to about 100 μm. Within this range, the adhesive film may be applied to an optical display.

In an implementation, an adhesive layer for polarizing plates may be formed between the polarizer 110 and the first optical film 120 to attach the polarizer to the first optical film. The adhesive layer for polarizing plates may be formed of a suitable adhesive for polarizing plates. For example, the adhesive for polarizing plates may include at least one of a water-based adhesive including a polyvinyl alcohol resin and a photocurable adhesive.

Next, a polarizing plate according to another embodiment will be described with reference to FIG. 2.

Figure 2:
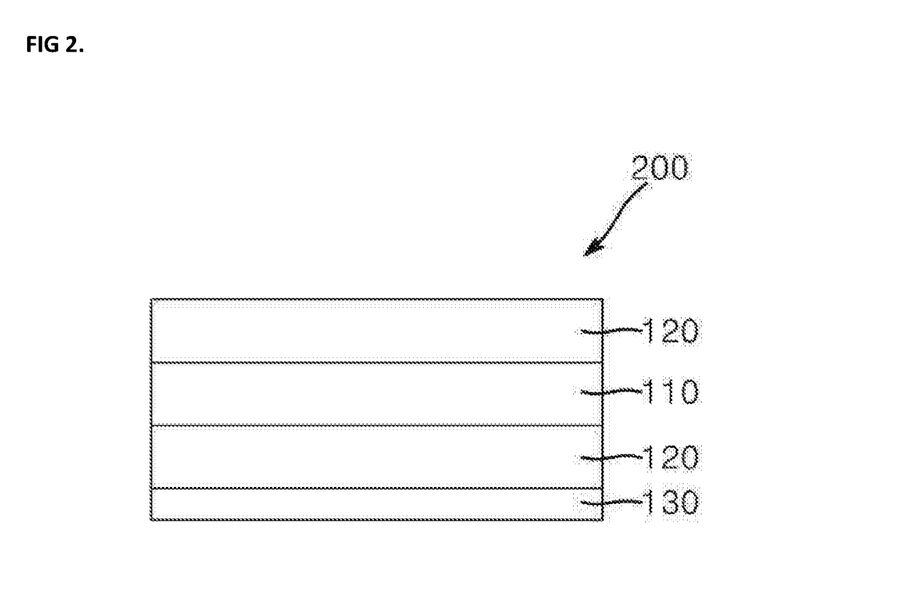
FIG. 2 illustrates a sectional view of a polarizing plate according to another embodiment.

Referring to FIG. 2, a polarizing plate 200 according to another embodiment may include a polarizer 110, a first optical film 120 formed on an upper surface of the polarizer 110, a first optical film 120 formed on a lower surface of the polarizer 110, and an adhesive film 130 formed on a lower surface of the first optical film 120, wherein the adhesive film 130 may be formed of the adhesive composition for polarizing plates according to the embodiment. As a result, the polarizing plate may not suffer from failure such as falling out, detachment, and bubbling of the adhesive film, and may exhibit good peel strength and durability while preventing light leakage. The polarizing plate according to this embodiment is substantially the same as the polarizing plate according to the above embodiment except that the first optical film is further formed between the polarizer and the adhesive film. Since the first optical film 120 is further formed between the polarizer 110 and the adhesive film 130, it is possible to increase mechanical strength of the polarizing plate.

Next, a polarizing plate according to a further embodiment of the invention will be described with reference to FIG. 3.

Figure 3:
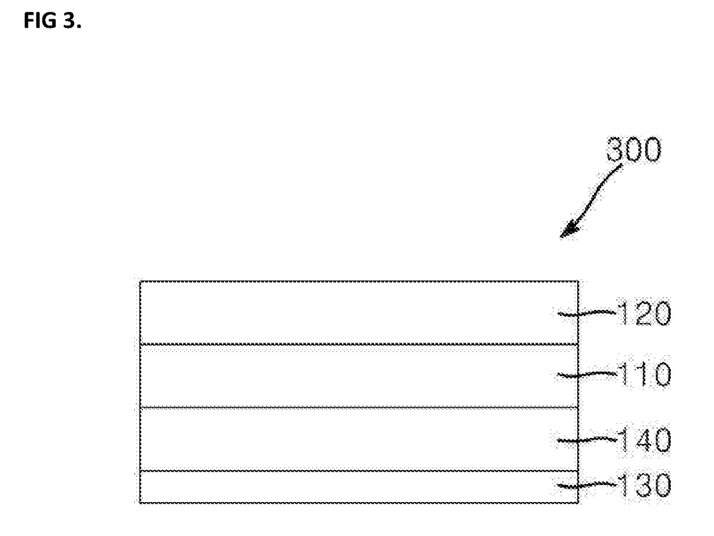
FIG. 3 illustrates a sectional view of a polarizing plate according to a further embodiment.

Referring to FIG. 3, a polarizing plate 300 according to a further embodiment may include a polarizer 110, a first optical film 120 formed on an upper surface of the polarizer 110, a second optical film 140 formed on a lower surface of the polarizer 110, and an adhesive film 130 formed on a lower surface of the second optical film 140, wherein the adhesive film 130 may be formed of the adhesive composition for polarizing plates according to the embodiment. The polarizing plate according to this embodiment may not suffer from failure such as falling out, detachment, and bubbling of the adhesive film, and may exhibit good peel strength and durability while preventing light leakage. The polarizing plate according to this embodiment is substantially the same as the polarizing plate according to the above embodiment except that the second optical film is further formed between the polarizer and the adhesive film.

The second optical film 140 may protect the polarizer 110 and may be formed of a different kind of resin than the first optical film. For example, the second optical film may be formed of at least one resin among cellulose resins including triacetylcellulose, polyester resins including polyethylene terephthalate, polybutylene terephthalate, polyethylene naphthalate, and polybutylene naphthalate, cyclic polyolefin resins, polycarbonate resins, polyether sulfone resins, polysulfone resins, polyamide resins, polyimide resins, polyolefin resins, polyacrylate resins, polyvinyl alcohol resins, polyvinyl chloride resins, and polyvinylidene chloride resins. These may be used alone or in combination thereof The second optical film 140 may have a thickness of about 10 μm to about 200 μm. Within this range, the second optical film can be applied to an optical display.

In an implementation, an adhesive layer for polarizing plates may be formed between the polarizer 110 and the second optical film 140 to attach the polarizer to the second optical film. The adhesive layer for polarizing plates may be formed of a suitable adhesive for polarizing plates. For example, the adhesive for polarizing plates may include at least one of a water-based adhesive including a polyvinyl alcohol resin and a photocurable adhesive.

According to the embodiments, an optical display including the polarizing plate is provided. The optical display may be a liquid crystal display or an organic light emitting device display.

EXAMPLES

Hereinafter, the embodiments will be described in more detail with reference to some examples. However, it should be understood that these examples are provided for illustration only and are not to be construed in any way as limiting.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparative Example 1

In a 1,000 ml reactor provided with a thermometer, a stirrer, a nitrogen feeding tube, and a reflux condenser, 100 parts by weight of n-butyl acrylate, 14.4 parts by weight of acryloyl morpholine, 7.3 parts by weight of 4-hydroxybutyl acrylate, and 0.015 parts by weight of N,N-(dimethylamino) ethyl acrylate were placed, followed by adding 66 parts by weight of methylethylketone as a solvent and stirring the components for 30 minutes while purging with nitrogen. The reactor was heated to an inner temperature of 60° C., and 0.08 parts by weight of azobis dimethylvaleronitrile and 0.013 parts by weight of 2-mercapto ethanol were added as initiators to the mixture, followed by reaction at 60° C. for 2 hours. 0.13 parts by weight of azobis dimethylvaleronitrile was further added to the mixture, followed by additional reaction for 2 hours. Then, the reactor was cooled to ambient temperature, thereby preparing a tertiary amine group-containing (meth)acrylic copolymer (solid content: 52.0%). The prepared tertiary amine group-containing (meth)acrylic copolymer had a weight average molecular weight (g/mol) of 400,000 g/mol and a glass transition temperature (Tg) of −35° C.

Preparative Example 2

In a 1,000 ml reactor provided with a thermometer, a stirrer, a nitrogen feeding tube, and a reflux condenser, 100 parts by weight of n-butyl acrylate, 14.4 parts by weight of acryloyl morpholine, 7.3 parts by weight of 4-hydroxybutyl acrylate, and 0.015 parts by weight of N,N-(dimethylamino) ethyl acrylate were placed, followed by adding 106 parts by weight of methylethylketone as a solvent and stirring the components for 30 minutes while purging with nitrogen. The reactor was heated to an inner temperature of 60° C., and 0.08 parts by weight of azobis dimethylvaleronitrile was added as an initiator to the mixture, followed by reaction at 60° C. for 2 hours. 0.13 parts by weight of azobis dimethylvaleronitrile and 0.05 parts by weight of 2-mercapto ethanol were further added to the mixture, followed by additional reaction for 2 hours. Then, the reactor was cooled to ambient temperature, thereby preparing a tertiary amine group-containing (meth)acrylic copolymer (solid content: 35.0%). The prepared tertiary amine group-containing (meth)acrylic copolymer had a weight average molecular weight (g/mol) of 800,000 g/mol and a glass transition temperature (Tg) of −36° C.

Preparative Example 3

In a 1,000 ml reactor provided with a thermometer, a stirrer, a nitrogen feeding tube and a reflux condenser, 100 parts by weight of n-butyl acrylate, 14.4 parts by weight of acryloyl morpholine, and 7.3 parts by weight of 4-hydroxybutyl acrylate, were placed, followed by adding 66 parts by weight of methylethylketone as a solvent and stirring the components for 30 minutes while purging with nitrogen. The reactor was heated to an inner temperature of 60° C., and 0.08 parts by weight of azobis dimethylvaleronitrile and 0.013 parts by weight of 2-mercapto ethanol were added as initiators to the mixture, followed by reaction at 60° C. for 2 hours. 0.13 parts by weight of azobis dimethylvaleronitrile was further added to the mixture, followed by additional reaction for 2 hours. Then, the reactor was cooled to ambient temperature, thereby preparing a tertiary amine group-free (meth)acrylic copolymer (solid content: 52.0%). The prepared tertiary amine group-free (meth)acrylic copolymer had a weight average molecular weight (g/mol) of 400,000 g/mol and a glass transition temperature (Tg) of −35° C.

Example 1

In terms of solid content, 100 parts by weight of the tertiary amine group-containing (meth)acrylic copolymer prepared in Preparative Example 1, 10 parts by weight of cellulose acetate butyrate (CAB-381-0.1, Eastman Chemical Company), 0.065 parts by weight of a TDI adduct (CORONATE L-45, Soken Chemical & Engineering, Ltd.) as an isocyanate compound, 0.05 parts by weight of an aluminum chelate compound (BXX-6460, Toyo Ink Co., Ltd.) as a metal chelate compound, and 40 parts by weight of ethyl acetate as a solvent were mixed, thereby preparing an adhesive composition for polarizing plates.

Examples 2 to 5 and Comparative Examples 1 to 4

Adhesive compositions for polarizing plates were prepared in the same manner as in Example 1 except that the kind of tertiary amine group-containing (meth)acrylic copolymer, the kind of cellulose resin, the kind of metal chelate compound, and the amount of each of the components were changed as listed in Tables 1 and 2.

TABLE 1

|  | | Example | | | | |
|---|---|---|---|---|---|---|
| (Unit: parts by weight) | | 1 | 2 | 3 | 4 | 5 |
| Tertiary amine group-containing (meth)acrylic copolymer (A) | Preparative Example 1 | 100 | — | — | — | — |
| | Preparative Example 2 | — | 100 | 100 | 100 | 100 |
| Cellulose resin (B) | I | 10 | 10 | 5 | 5 | — |
| | II | — | — | — | — | 10 |
| Isocyanate compound (c1) | | 0.065 | 0.065 | 0.065 | 0.09 | 0.065 |
| Metal chelate compound (c2) | I | 0.05 | 0.05 | 0.1 | 0.05 | 0.05 |
| | II | — | — | — | — | — |
| Solvent | | 40 | 40 | 40 | 40 | 40 |

TABLE 2

|  | | Comparative Example | | | |
|---|---|---|---|---|---|
| (Unit: parts by weight) | | 1 | 2 | 3 | 4 |
| Tertiary amine group-containing (meth)acrylic copolymer (A) | Preparative Example 1 | 100 | — | 100 | 100 |
| | Preparative Example 2 | — | — | — | — |
| | Preparative Example 3 | — | 100 | — | — |
| Cellulose resin (B) | I | 5 | 5 | — | — |
| | II | — | — | — | — |
| Isocyanate compound (c1) | | 0.065 | 0.065 | 0.065 | 0.065 |
| Metal chelate compound (c2) | I | — | 0.05 | 0.05 | — |
| | II | — | — | — | — |
| Solvent | | 40 | 40 | 40 | 40 |

Specification of Each Component Used in Examples and Comparative Examples

Cellulose resin I: cellulose acetate butyrate (CAB-381-0.1, Eastman Chemical Company), hydroxyl group content: 1.3%, Mw: 40,000 g/mol, Tg: 133° C., butyrate 38 wt %, acetyl 13.5 wt %.

Cellulose resin II: cellulose acetate butyrate (CAB-500-5, Eastman Chemical Company), hydroxyl group content: 1.0%, Mw: 57,000 g/mol, Tg: 96° C., butyrate 51 wt %, acetyl 4 wt %.

Isocyanate compound: TDI adduct (L-45, Soken Chemical & Engineering, Ltd.).

Metal chelate compound I: aluminum-based chelate compound (BXX-6460, Dongyang Ink Co., Ltd.).

The adhesive composition for polarizing plates prepared in the Examples and Comparative Examples, and adhesive films and polarizing plates formed using the same were evaluated as to the following properties, and evaluation results are shown in the following Table 3.

TABLE 3

| | Gel fraction (%) | | | | | |
|---|---|---|---|---|---|---|
| | After 12 hours | After 48 hours | Creep | Warpage | Reliability | Light leakage |
| Example 1 | 60 | 60 | ○ | ○ | ○ | ○ |
| Example 2 | 70 | 71 | ○ | ○ | ○ | ○ |
| Example 3 | 71 | 71 | ○ | ○ | ○ | ○ |
| Example 4 | 73 | 73 | ○ | ○ | ○ | ○ |
| Example 5 | 70 | 70 | ○ | ○ | ○ | ○ |
| Comparative Example 1 | 64 | 69 | ○ | ○ | X | ○ |
| Comparative Example 2 | 51 | 57 | X | ○ | Δ | ○ |
| Comparative Example 3 | 52 | 57 | X | ○ | Δ | ○ |
| Comparative Example 4 | 42 | 56 | X | ○ | X | ○ |

As shown in Table 3, the adhesive compositions for polarizing plates according to the Examples had high gel fractions after 12-hour aging and thus may help reduce aging time. In addition, the adhesive compositions according to the Examples had a small difference between a 48-hour aging gel fraction and a 12-hour aging gel fraction, thereby providing good reliability. Furthermore, the adhesive compositions according to the Examples exhibited good creep characteristics, warpage characteristics, and reliability after 12-hour aging, while suppressing light leakage, and thus may be used for adhesive films for polarizing plates, e.g., by 12-hour aging.

It may be seen that the adhesive composition prepared without using the metal chelate compound in Comparative Example 1, the adhesive composition prepared without using the tertiary amine group-containing (meth)acrylic copolymer in Comparative Example 2, the adhesive composition prepared without using the cellulose resin in Comparative Example 3, and the adhesive composition prepared without using the metal chelate compound and cellulose resin in Comparative Example 4 had low adhesion and reliability.

Method for Property Evaluation

1) Gel fraction: Gel fraction was measured according to the following Equation 1.

Gel fraction=$(WC-WA)/(WB-WA) \times 100$,

In Equation 1, WA is a weight of a wire mesh; WB is a total weight of the wire mesh and a specimen of an adhesive film for polarizing plates, which is obtained by depositing 1.0 g of an adhesive composition for polarizing plates to a thickness of 20 μm on a release film, followed by aging the adhesive composition for polarizing plates on the release film at 23° C. and 55% RH for a predetermined period of time (e.g., aging time such as 12 hours or 48 hours), and then is placed on the wire mesh; and WC is a total weight of the wire mesh and the adhesive film, which are placed in a sample bottle, left for 1 day after adding 50 cc of ethyl acetate to the sample bottle, and then dried at 90° C. for 24 hours.

In measurement of gel fraction, a polyethylene terephthalate film (thickness: 38 μm) was used as the release film, a 100 mL wide mouth bottle was used as a sample bottle, and the wire mesh was a 200 mesh net. 12-hour gel fraction refers to gel fraction after aging for 12 hours in Equation 1 and 48-hour gel fraction refers to gel fraction after aging for 48 hours in Equation 1.

2) Creep: The adhesive composition was applied to a polyethylene terephthalate film, dried to a thickness of 20 μm, followed by aging at 23° C. and 55% RH for 12 hours, thereby preparing an adhesive film (thickness: 20 μm). A specimen was prepared by stacking the adhesive film (thickness: 20 μm) on a polarizing plate, in which a triacetylcellulose film, a PVA polarizer, and a triacetylcellulose film were sequentially stacked, and cut to a size of 15 mm×100 mm. Then, the specimen was stacked onto an alkali-free glass (alkali-free soda glass) substrate to have a contact area of 15 mm×15 mm, followed by measurement of creep characteristics using TEXTURE ANALYZER TA.XT Plus (load cell: 5 kg, EKO Instruments). Creep characteristics were evaluated at a constant temperature of 22° C. under a load of 2,250 gf for 1,000 seconds.

○: Creep length of 30 μm to 300 μm

Δ: Creep length of greater than 300 μm to 800 μm x: Creep length of greater than 800 μm 3) Reliability: After preparing a polarizing plate in which a triacetylcellulose film, a PVA polarizer, and a triacetylcellulose film were sequentially stacked, the adhesive composition for polarizing plates was coated onto the triacetylcellulose film of the polarizing plate. Here, a light absorption axis of the polarizing plate was 180°. Then, the adhesive composition coated on the polarizing plate were subjected to aging in a constant temperature/humidity chamber at 23° C. and 55% RH for 12 hours, and the polarizing plate was cut into a sample (160 mm×100 mm, length×width), which in turn was left in an autoclave at 323 K for 1,000 seconds, thereby preparing a specimen for evaluation of reliability. Reliability of the specimens was evaluated by observing bubbling or peeling with the naked eye after the specimen was left at 85° C. for 96 hours and then left at ambient temperature for 1 hour.

○: No detachment, no dragging, or no bubble

Figure 5:
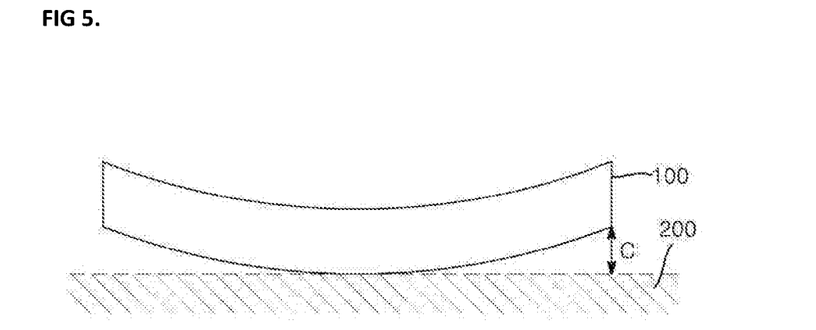
FIG. 5 illustrates a conceptual view of measurement of warpage of a polarizing plate.

Δ: Minute detachment, minute dragging or minute bubbles x: Occurrence of detachment, dragging, or bubbles 4) Warpage: After preparing a polarizing plate in which a triacetylcellulose film, a PVA polarizer and a triacetylcellulose film were sequentially stacked, the adhesive composition for polarizing plates was coated onto the triacetylcellulose film of the polarizing plate. Then, the prepared polarizing plates (150 mm×90 mm, length×width) were stacked onto front and rear sides of an alkali-free glass substrate (160 mm×100 mm, length×width) to form a cross Nicol specimen. Here, a light absorption axis of the polarizing plate stacked on the front side of the substrate was 180° and a light absorption axis of the polarizing plate stacked on the rear side thereof was 90°. The prepared specimen 400 was left in a constant temperature chamber at 85° C. for 48 hours and then left at ambient temperature for 1 hour, followed by measuring a maximum warpage height C from the ground 500 using a Digital Height Gauge (Mitutoyo Co., Ltd.), as shown in FIG. 5.

○: Maximum warpage height (C) of 0.5 mm or less

Figure 4:
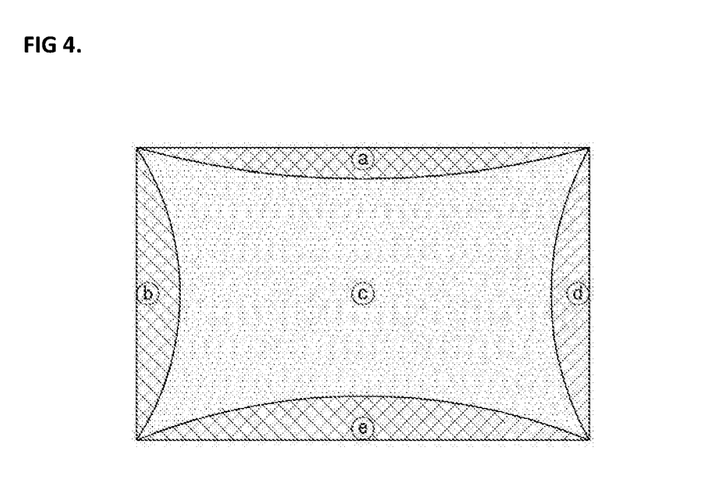
FIG. 4 illustrates light leakage measurement locations on a panel.

Δ: Maximum warpage height (C) of greater than 0.5 mm to less than 1.0 mm x: Maximum warpage height (C) of 1.0 mm or more 5) Light leakage: After preparing a polarizing plate in which a triacetylcellulose film, a PVA polarizer, and a triacetylcellulose film were sequentially stacked, the adhesive composition for polarizing plates was coated to a thickness of 20 μm on the triacetylcellulose film of the polarizing plate. Then, the adhesive composition was subjected to aging in a constant temperature/humidity chamber at 23° C. and 55% RH for 12 hours to prepare a specimen. Thereafter, the specimen was cut to a size of 140 mm×80 mm (length×width, 7 inch) and attached to both surfaces of a glass substrate. Here, the specimens for light leakage evaluation were stacked on both surfaces of the glass substrate such that light absorption axes thereof were orthogonal to each other. The specimens were maintained at 323 K for 1,000 seconds in an autoclave under vacuum in order to obtain good adhesion. After operating an LCD using the specimens, brightness at the front side of the display panel was measured from a height of 1 m using a brightness tester (RISA, Hiland Co., Ltd.). Specifically, brightness ⓒ at the central region of the panel and brightness ⓐ, ⓑ, ⓓ and ⓔ at edges of the panel at which light leakage occurred were measured. As shown in FIG. 4, brightness measuring points were placed at four midpoints of each side of the panel, respectively. Here, each side of the panel was disposed to adjoin the circumference of a circle for brightness measurement having a radius of 0.5 cm. In FIG. 4, ⓐ, ⓑ, ⓒ, ⓓ and ⓔ indicate brightness measuring points. The degree of light leakage (ΔL) was quantified according to the following Equation 2. A lower ΔL value indicates better light leakage characteristics, which are evaluated according to the following criteria.

$$L=[(a+b+d+e)/4]/c-1$$ [Equation 2]

In Equation 2 a, b, d and e represent brightness values measured at brightness measurement points ⓐ, ⓑ, ⓓ and ⓔ in FIG. 4, respectively, and c is a brightness value at the central region ⓒ in FIG. 4.

○: No light leakage, 0≤ΔL≤0.1.

Δ: Slight light leakage, 0.1<ΔL<0.3.

x: Severe light leakage, 0.3≤ΔL.

By way of summation and review, an adhesive composition for polarizing plates may be aged in an aging chamber for 3 to 7 days, or for 10 days or more as needed. Aging may consume cost and time. If the adhesive composition is not subjected to sufficient aging, an adhesive film formed of the adhesive composition may exhibit poor properties in terms of, e.g., creep characteristics, peel strength, reliability, light leakage, reworkability, and the like, and thus may not be suitably used in polarizing plates.

The embodiments may provide an adhesive composition for polarizing plates that may be prepared by performing an aging process for only a short period of time, and thus helps secure a high gel fraction when aged for only 12 hours.

The embodiments may provide an adhesive composition for polarizing plates that may realize an adhesive film having good properties in terms of creep characteristics and reliability when aged for only 12 hours.

The embodiments may provide an adhesive composition for polarizing plates that may help improve light leakage prevention.

The embodiments may provide an adhesive composition for polarizing plates that may realize an adhesive film having good properties in terms of creep characteristics and reliability.

The embodiments may provide an adhesive composition for polarizing plates that may be prepared by aging for only a short period of time, and may secure a high gel fraction after aging for only 12 hours. The embodiments may provide an adhesive composition for polarizing plates that may be used as an adhesive film for polarizing plates even after aging for only 12 hours. The embodiments may provide an adhesive composition for polarizing plates that may secure good light leakage prevention. The embodiments may provide an adhesive composition for polarizing plates that may realize an adhesive film having good properties in terms of creep characteristics, reliability, and reworkability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate comprising an adhesive film for polarizing plates, the adhesive film being formed from an adhesive composition for polarizing plates, the adhesive composition including:
   a tertiary amine group-containing (meth)acrylic copolymer;
   a cellulose resin;
   an isocyanate compound; and
   a metal chelate compound.

2. The polarizing plate as claimed in claim 1, wherein the adhesive composition has a gel fraction of about 50% or more after 12-hour aging, as calculated according to the following equation:

Gel fraction=$(WC-WA)/(WB-WA) \times 100$, wherein WA is a weight of a wire mesh; WB is a total weight of the wire mesh and a specimen of an adhesive film for polarizing plates, which is obtained by depositing 1.0 g of an adhesive composition for polarizing plates to a thickness of 20 μm on a release film, followed by aging the adhesive composition for polarizing plates on the release film at 23° C. and 55% RH for 12 hours, and then is placed on the wire mesh; and WC is a total weight of the wire mesh and the adhesive film, which are placed in a sample bottle, left for 1 day after adding 50 cc of ethyl acetate to the sample bottle, and then dried at 90° C. for 24 hours.

3. The polarizing plate as claimed in claim 2, wherein the adhesive composition has an absolute value of a difference between a gel fraction after 12-hour aging and a gel fraction after 48-hour aging of about 5% or less.

4. The polarizing plate as claimed in claim 1, wherein the adhesive composition includes:
   100 parts by weight of the tertiary amine group-containing (meth)acrylic copolymer;
   about 3 parts by weight to about 10 parts by weight of the cellulose resin;
   about 0.05 parts by weight to about 5 parts by weight of the isocyanate compound; and
   about 0.01 parts by weight to about 10 parts by weight of the metal chelate compound.

5. The polarizing plate as claimed in claim 1, wherein the tertiary amine group-containing (meth)acrylic copolymer includes about 0.01 wt % to about 5 wt % of (meth)acrylic repeat units having a tertiary amine group, based on a total weight of repeat units in the copolymer.

6. The polarizing plate as claimed in claim 1, wherein the tertiary amine group-containing (meth)acrylic copolymer is prepared by copolymerization of a monomer mixture, the monomer mixture including:
   a hydroxyl group-containing (meth)acrylic monomer,
   a tertiary amine group-containing (meth)acrylic monomer, and
   a monomer having a glass transition temperature Tg of about 100° C. or higher.

7. The polarizing plate as claimed in claim 6, wherein the monomer mixture further includes an alkyl group-containing (meth)acrylic monomer.

8. The polarizing plate as claimed in claim 6, wherein the tertiary amine group-containing (meth)acrylic monomer includes N,N-(dimethylamino)ethyl (meth)acrylate or N,N-(diethylamino)ethyl (meth)acrylate.

9. The polarizing plate as claimed in claim 6, wherein the monomer having a glass transition temperature Tg of about 100° C. or more includes (meth)acryloyl morpholine, N-vinylpyrrolidone, or isobornyl (meth)acrylate.

10. The polarizing plate as claimed in claim 7, wherein the monomer mixture includes:
    about 0.1 wt % to about 20 wt % of the hydroxyl group-containing (meth)acrylic monomer,
    about 0.01 wt % to about 5 wt % of the tertiary amine group-containing (meth)acrylic monomer,
    about 1 wt % to about 30 wt % of the monomer having a glass transition temperature Tg of about 100° C. or more, and
    about 60 wt % to about 95 wt % of the alkyl group-containing (meth)acrylic monomer.

11. The polarizing plate as claimed in claim 1, wherein the tertiary amine group-containing (meth)acrylic copolymer has a glass transition temperature of about −45° C. to about −30° C.

12. The polarizing plate as claimed in claim 1, wherein the cellulose resin is cellulose acetate butyrate.

13. The polarizing plate as claimed in claim 1, wherein the cellulose resin includes about 1 wt % to about 10 wt % of a hydroxyl group, based on a total weight of the cellulose resin.

14. The polarizing plate as claimed in claim 1, wherein the metal chelate compound is a tin-based chelate compound or an aluminum-based chelate compound.

15. The polarizing plate as claimed in claim 1, wherein a weight ratio of the isocyanate compound to the metal chelate compound is 1:0.05 to 1:5.

16. The polarizing plate as claimed in claim 1, wherein the adhesive composition further includes a silane coupling agent or a reworking agent.

17. The polarizing plate as claimed in claim 16, wherein:
    the adhesive composition includes the silane coupling agent, and
    the silane coupling agent includes an acetoacetyl group-containing silane coupling agent.

18. An optical display comprising the polarizing plate as claimed in claim 1.

* * * * *